May 5, 1931.  C. STEHL  1,803,877
COOKER
Filed Aug. 10, 1929

Inventor.
Conrad Stehl
By Harry C. Schroeder
Attorney.

Patented May 5, 1931

1,803,877

UNITED STATES PATENT OFFICE

CONRAD STEHL, OF OAKLAND, CALIFORNIA

COOKER

Application filed August 10, 1929. Serial No. 384,994.

My invention is an improved cooker which is set on top of a gas stove for cooking. My cooker is simple in construction and highly efficient in use.

Referring to the annexed drawing in which my invention is illustrated and which forms a part of this specification:

Figure 1:
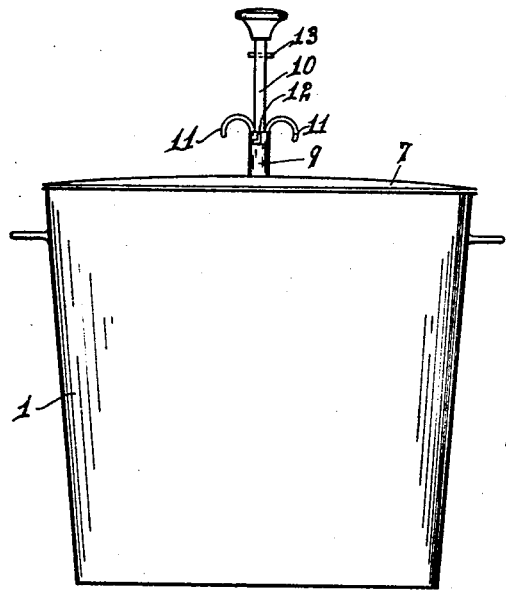
Figure 1 is an elevation of my cooker.
Figure 2:
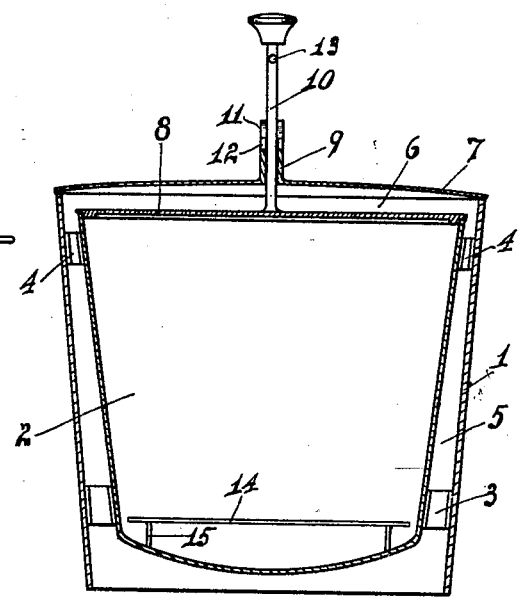
Figure 2 is a transverse vertical section of my cooker.
Figure 3:
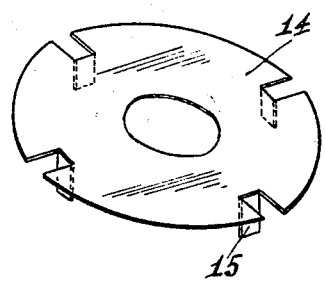
Figure 3 is a perspective view of the false bottom of the cooking receptacle.

My cooker comprises a downwardly converging conical casing 1 open at the bottom and a similarly shaped cooking receptacle 2 of smaller diameter than said casing, which receptacle is mounted within said casing with the top thereof below the top of said casing on lower brackets 3 and upper brackets 4, so as to provide an annular heat space 5 between the receptacle and a heat space 6 between the top of the receptacle and said casing. A lid 7 fits on the top of casing 1 and a lid 8 fits on top of receptacle 2. On the top of lid 7 in the center thereof is formed an upstanding bearing 9 through which extends a rod 10 upstanding from the center of lid 8 of the receptacle 2. Handles 11—11 secured to the upper end of bearing 8 for raising and lowering the lid 6 on the rod 9, and a bayonet joint comprising bayonet joint slots 12 in the upper end of said bearing and pin 13 extending through the upper end of rod 10 is provided for holding the lid 7 lifted on said rod above the top of the casing 1 to allow the heat to pass out of the top of said casing. A false bottom 14 mounted on angle iron legs 15 rests in the bottom of the cooking receptacle 2.

My cooker is placed on the top of a gas stove, the food to be cooked placed in the receptacle 2, and the heat of the stove passing upwardly through the heat space 5 cooks the food in the receptacle. The lid 7 may be raised to allow the heat to escape out of the top of the casing 1.

Having described my invention, I claim:

1. A cooker comprising a frustro-conical shell open at both ends, a removable frustro-conical vessel with segmento-spheroidal bottom disposed within and spacedly related to said shell, spacing members interiorly attached to said shell, a cover for said shell provided with a centrally disposed vertical bearing, a cover for said vessel provided with a centrally disposed vertical rod passing through said bearing and means cooperating between said bearing and said rod whereby said shell cover may be supported in spaced relation relative to the top of the shell and supported by the vessel cover.

2. A cooker comprising a frustro-conical bottomless shell, a removable frustro-conical vessel spacedly disposed within said shell, means integral with the interior of said shell for supporting said vessel, a removable cover for said vessel provided with a centrally disposed vertical rod, a bayonet pin transversely disposed adjacent the upper end of said rod, a removable cover for said shell provided with a centrally disposed bearing cooperating with and slidable on said rod, oppositely disposed bayonet slots adjacent the upper end of said bearing whereby said shell cover may be raised and supported above said shell.

3. A cooker comprising a frustro-conical shell open at both ends and provided with inwardly extending wedge support members, a removable cover for said shell provided with a centrally disposed vertical bearing or sleeve and provided with bayonet slots adjacent the upper end, a frustro-conical vessel with segmento-spheroidal bottom removably disposed within said shell and spacedly related, and frictionally supported by said support members, a cover for said vessel provided with a centrally disposed vertical lifter rod slidably mounted in said bearing and extending therethrough, a bayonet pin transversely disposed adjacent the upper end of said rod and adapted to cooperate with said bayonet slots when said shell cover is raised thereby supporting said shell cover above and in spaced relation to the top of the shell.

4. A cooker comprising an outer cylindrical shell provided with inwardly projecting combination spacers and supports, a removable frustro-conical vessel spacedly related and supported therein, a removable false bottom for said vessel consisting of a metal disc with depending legs formed adjacent the periphery thereof, a cover for said vessel, a cover for said shell, a centrally disposed bearing on said shell cover cooperating with a centrally disposed rod on said vessel cover, a bayonet slot adjacent the top of said bearing adapted to cooperate with a bayonet pin disposed adjacent the upper end of said rod and a knob disposed at the end of said rod.

In testimony whereof I have affixed my signature.

CONRAD STEHL.